US006836094B1

(12) United States Patent
Bender

(10) Patent No.: US 6,836,094 B1
(45) Date of Patent: Dec. 28, 2004

(54) MOTOR VEHICLE BATTERY DISCONNECT SWITCH CIRCUITS

(75) Inventor: Burnell L. Bender, Woodburn, IN (US)

(73) Assignee: International Truck Intellectual Property Company, LLC, Warrenville, IL (US)

(*) Notice: Subject to any disclaimer, the term of this patent is extended or adjusted under 35 U.S.C. 154(b) by 28 days.

(21) Appl. No.: 10/611,005

(22) Filed: Jul. 1, 2003

(51) Int. Cl.[7] .................................................. H02J 7/00
(52) U.S. Cl. ..................................................... 320/104
(58) Field of Search .......................... 320/104; 307/10.5, 307/10.6; 123/179.4; 340/679

(56) References Cited

U.S. PATENT DOCUMENTS 5,024,186 A * 6/1991 Long et al. ............... 123/179.4
5,612,578 A * 3/1997 Drew ......................... 307/10.5
5,757,086 A * 5/1998 Nagashima ................ 307/10.6
5,990,800 A * 11/1999 Tamaki et al. .............. 340/679

* cited by examiner

Primary Examiner—Pia Tibbits
(74) Attorney, Agent, or Firm—Jeffery P. Calfa; Dennis Kelly Sullivan; Susan L. Lukasik

(57) ABSTRACT

A disconnect switch (30, 30SA) is placed in circuit between a battery bank (12) and a distribution point (30B) for the entire electrical system load except the engine cranking motor (24). This allows the circuit between the battery bank and a cranking motor solenoid (22) that operates the cranking motor to be switch-free. A switch-free circuit allows a continuous cable to connect the battery bank to the cranking motor solenoid, significantly reducing the electrical resistance between the battery bank and the cranking motor solenoid.

31 Claims, 4 Drawing Sheets

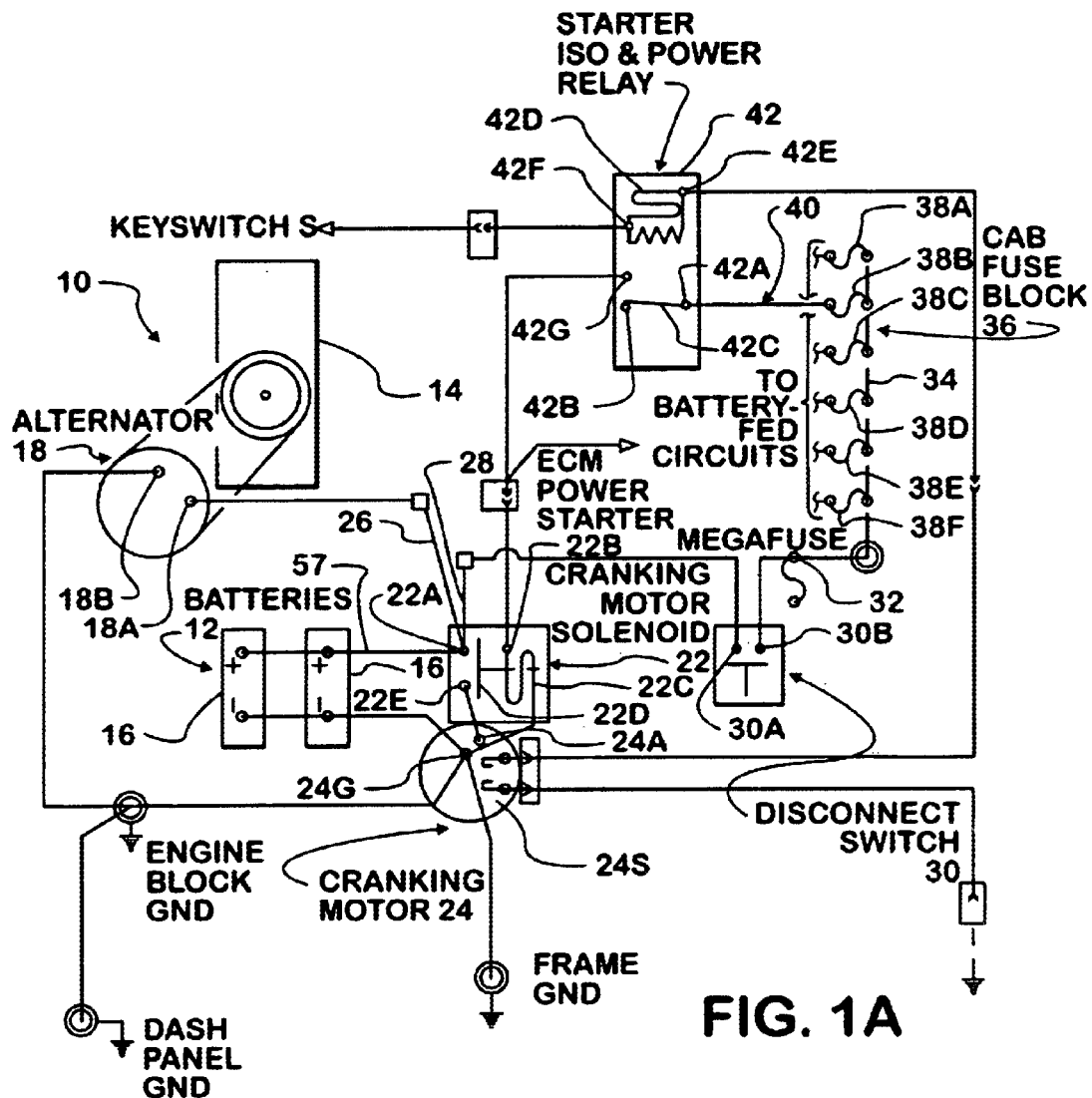
FIG. 1A
FIG. 2
FIG. 3
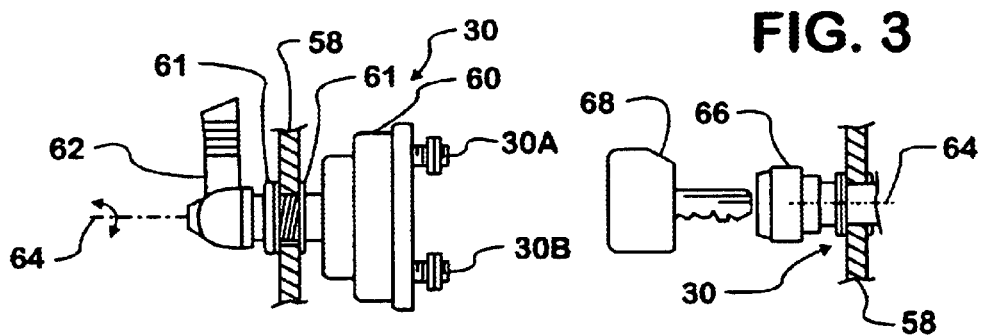

MOTOR VEHICLE BATTERY DISCONNECT SWITCH CIRCUITS

FIELD OF THE INVENTION

This invention relates generally to electrical systems of motor vehicles. More particularly, the invention relates to battery disconnect circuits for preventing battery drain when the engine does not run for extended periods of time.

BACKGROUND OF THE INVENTION

Certain motor vehicles, heavy trucks that are powered by diesel engines for example, may be parked for extended periods of time. If its engine is allowed to keep running after a vehicle has been parked, the alternator should be effective to keep the battery bank charged. If the engine is shut down, either intentionally by the driver, or automatically by a device such as an idle shutdown timer, while the circuits for electric devices remain on, the battery bank will begin to drain. For example, an ignition switch will typically remain on after an idle shutdown timer has timed out, and certain circuits that are left on may continue to draw current.

Because the battery bank must be able to provide sufficient current for cranking the engine at starting, a diesel-powered heavy truck typically has a battery bank comprising multiple storage batteries ganged together in parallel. If the battery bank is allowed to drain to the point where it cannot deliver the large cranking current necessary for starting the engine, the vehicle cannot be operated. Because a heavy truck may be parked for an extended period of time, it is therefore appropriate to guard against the possibility that its battery bank will be drained due to failure to turn off all its electric circuits.

Consequently, it is known to place a disconnect switch in circuit between the battery bank and the rest of the vehicle electrical system. All that need be done to avoid inadvertent draining of the battery bank while a heavy truck is parked is to turn the disconnect switch off, an act that would typically be performed by the driver upon turning the engine off and departing the vehicle. Because of the particular placement of the disconnect switch in circuit, the disconnect switch is physically mounted at the battery box outside the truck cab. The driver can therefore turn the switch off and on only when he is outside the cab.

A typical installation for a disconnect switch involves the use of two heavy conductors, one to connect the battery terminal of the disconnect switch to a terminal of the battery bank, such as the positive terminal in a negative ground electrical system, and another to connect the load terminal of the disconnect switch to a distribution point for the entire electrical system load, including a cranking motor solenoid through which cranking current is delivered to the cranking motor. Such a distribution point may be a terminal on the cranking motor solenoid.

SUMMARY OF THE INVENTION

The present invention relates to disconnect switch circuits that are believed to offer better solutions for avoiding inadvertent battery draining when a vehicle is parked for an extended period of time. Rather than placing a disconnect switch in circuit between a battery bank and a distribution point for the entire electrical system load, the invention places the disconnect switch between the battery bank and a distribution point for the entire system load except the engine cranking motor. This allows the circuit between the battery bank and the contacts of a cranking motor solenoid that is energized to run the cranking motor to be switch-free. The cranking motor solenoid is often integrated with the cranking motor itself, rather than being a discrete component that is separate from the cranking motor so as to have a battery terminal connected by a heavy conductor to the ungrounded battery bank terminal and a load terminal connected by another heavy conductor to a terminal on the cranking motor. When the cranking motor solenoid is integrated with the cranking motor, the integrated assembly has a terminal connected to the ignition switch start contact, either directly or through a relay, and a terminal to which one termination of such a switch-free circuit is connected. Such a switch-free circuit, whether connected to a cranking motor solenoid that is separate from the cranking motor or one that is integrated with the cranking motor, provides important advantages.

Rather than using one or more heavy conductors from the ungrounded battery bank terminal to the disconnect switch and one or more heavy conductors from the disconnect switch to the cranking motor solenoid for connecting the ungrounded terminal of the battery bank to the cranking motor when the disconnect switch is placed between the battery bank and the cranking motor, the present invention provides a continuous, switch-free conduction path from the ungrounded battery bank terminal to the contacts of the cranking motor solenoid. Although the length of such a continuous, switch-free conduction path may possibly be slightly greater than the combined lengths of the separate conductors it replaces, the number of terminals at the conductor ends are reduced from four to two, and the number of fasteners needed is cut in half. And although an installation that uses the invention may require an extra conductor and associated fasteners from the load distribution point to the battery terminal of the disconnect switch, that cable need not be as heavy as the one from the battery bank to the cranking motor because it does not have to be sized to also carry the amperage of the cranking motor current.

Another advantage of removing the disconnect switch from the battery feed to the cranking motor solenoid is that the electrical resistance between the battery bank and the cranking motor solenoid is significantly reduced. A switch-free path eliminates the contact resistance that is inherently present in a switch. And although some might consider that resistance small, it is significant when the large amperage of the cranking current is considered. Large current flowing through even a small resistance creates a non-trivial voltage drop and attendant heating. Avoidance of such losses is believed especially significant and beneficial when one recognizes the difficult task of starting a diesel engine, which is most noticeable in subzero weather.

Allowing the cranking motor to become a potential battery drain because of the placement of the disconnect switch in accordance with principles of the invention should have no serious adverse consequences because it is quite improbable the cranking motor solenoid circuit that energizes the cranking motor solenoid to operate the cranking motor will be inadvertently left on when the vehicle is parked and the engine turned off. First, operation of the cranking motor is quite likely to be noticed unless a person is totally deaf. Second, ignition switches that are presently in widespread use require maintained contact by the driver against a return spring force when placed in START position for cranking the engine. The return spring force will return the switch to IGNITION position, breaking the START feed, when the driver ceases the maintained contact.

The invention is therefore believed to provide a cost-effective improvement for avoiding unintended battery draining in a motor vehicle when parked for an extended period of time, and the possible inconvenience of having to jump-start the engine, to replace one or more batteries, or perhaps even to tow the vehicle.

One general aspect of the invention relates to an engine-powered land vehicle comprising a chassis containing an engine and a drivetrain through which the engine propels the vehicle on land. A body that provides a compartment for a driver of the vehicle is disposed on the chassis. The electrical system comprises a battery bank having one or more D.C. storage batteries, an electric cranking motor that draws current from the battery bank to crank the engine at starting when a cranking motor solenoid is energized, and a main control switch (commonly known as a ignition switch) that can be placed selectively in any one of multiple positions by the driver to selectively control the delivery of current from the battery bank to multiple circuit protection devices (typically fuses and circuit breakers) for distributing current to individual circuits in the vehicle, including a cranking motor solenoid circuit through which the cranking motor solenoid is energized. A disconnect switch is in circuit between the battery bank and the multiple circuit protection devices for selectively connecting and disconnecting the multiple circuit protection devices to and from the battery bank. A switch-free connection provides continuity between the battery bank and the cranking motor solenoid, both when the disconnect switch is connecting the multiple circuit protection devices to the battery bank and when the disconnect switch is disconnecting the multiple circuit protection devices from the battery bank. The switch-free connection carries current from the battery bank to a terminal of the cranking motor solenoid that is connected through a closed contact in the solenoid to the cranking motor when the cranking motor solenoid circuit is energizing a coil in the cranking motor solenoid that is forcing the contact in the solenoid closed.

The disconnect switch may assume any of several different embodiments according to further principles of the invention.

Another general aspect of the invention relates to an electrical system in an engine-powered land vehicle. A battery bank comprises one or more D.C. storage batteries. An electric cranking motor draws current from the battery bank to crank the engine at starting when a cranking motor solenoid is energized. A disconnect switch is in circuit between the battery bank and a distribution point for the entire electrical system load except the engine cranking motor. The disconnect switch selectively connects and disconnects the entire electrical system load except the engine cranking motor to and from the battery bank. A switch-free electric circuit provides continuity between the battery bank and the cranking motor solenoid independent of the disconnect switch and carries current for operating the cranking motor. Here too, the disconnect switch may assume any of several different embodiments.

Still another aspect of the invention relates to an electrical system in an engine-powered land vehicle comprising a battery bank comprising one or more D.C. storage batteries and an electric cranking motor that draws current from the battery bank to crank the engine at starting when a cranking motor solenoid is energized. A disconnect switch is in circuit between the battery bank and a main distribution point through which current is delivered from the battery bank to all electrical devices in the electrical system except the cranking motor and a normally open switch that, when operated closed, energizes a solenoid coil that operates the disconnect switch from an OFF position disconnecting all the devices except the cranking motor and the normally open switch from the battery bank to an ON position connecting all the devices except the cranking motor and the normally open switch to the battery bank. A switch-free electric circuit provides continuity between the battery bank and the cranking motor solenoid and carries current for operating the cranking motor and current for energizing the solenoid coil that operates the disconnect switch from OFF position to ON position when the normally open switch is operated closed.

One more aspect of the invention relates to a method for avoiding draining a battery bank of one or more storage batteries in an engine-powered land vehicle to a point where the battery bank is incapable of operating an electric cranking motor to crank the engine at starting while providing a switch-free path for current flow from the battery bank to the cranking motor solenoid during engine cranking. The method comprises placing a disconnect switch that can be operated to respective ON and OFF positions in circuit between the battery bank and multiple circuit protection devices that distribute current to individual circuits in the vehicle, including a cranking motor solenoid circuit through which the cranking motor solenoid is energized to connect the cranking motor solenoid to the battery bank for operating the cranking motor to crank the engine at starting, so that the circuit protection devices are connected to the battery bank when the disconnect switch is in ON position and disconnected from the battery bank when the disconnect switch is in OFF position. The cranking motor solenoid is connected to the battery bank through a switch-free current path for carrying cranking current from the battery bank to the cranking motor via the cranking motor solenoid when the disconnect switch is in ON position and the cranking motor solenoid is being energized by the cranking motor solenoid circuit.

The foregoing, along with further aspects, features, and advantages of the invention, will be seen in the following disclosure of a presently preferred embodiment of the invention depicting the best mode contemplated at this time for carrying out the invention. The disclosure includes drawings, briefly described as follows.

BRIEF DESCRIPTION OF THE DRAWINGS

FIG. 1A is a schematic diagram of one portion of a motor vehicle electrical system in accordance with principles of the present invention.

FIG. 2 is a side elevation view a first embodiment of disconnect switch in FIG. 1A.

FIG. 3 is a side elevation view a second embodiment of disconnect switch.

DESCRIPTION OF THE PREFERRED EMBODIMENT

Figure 1B:
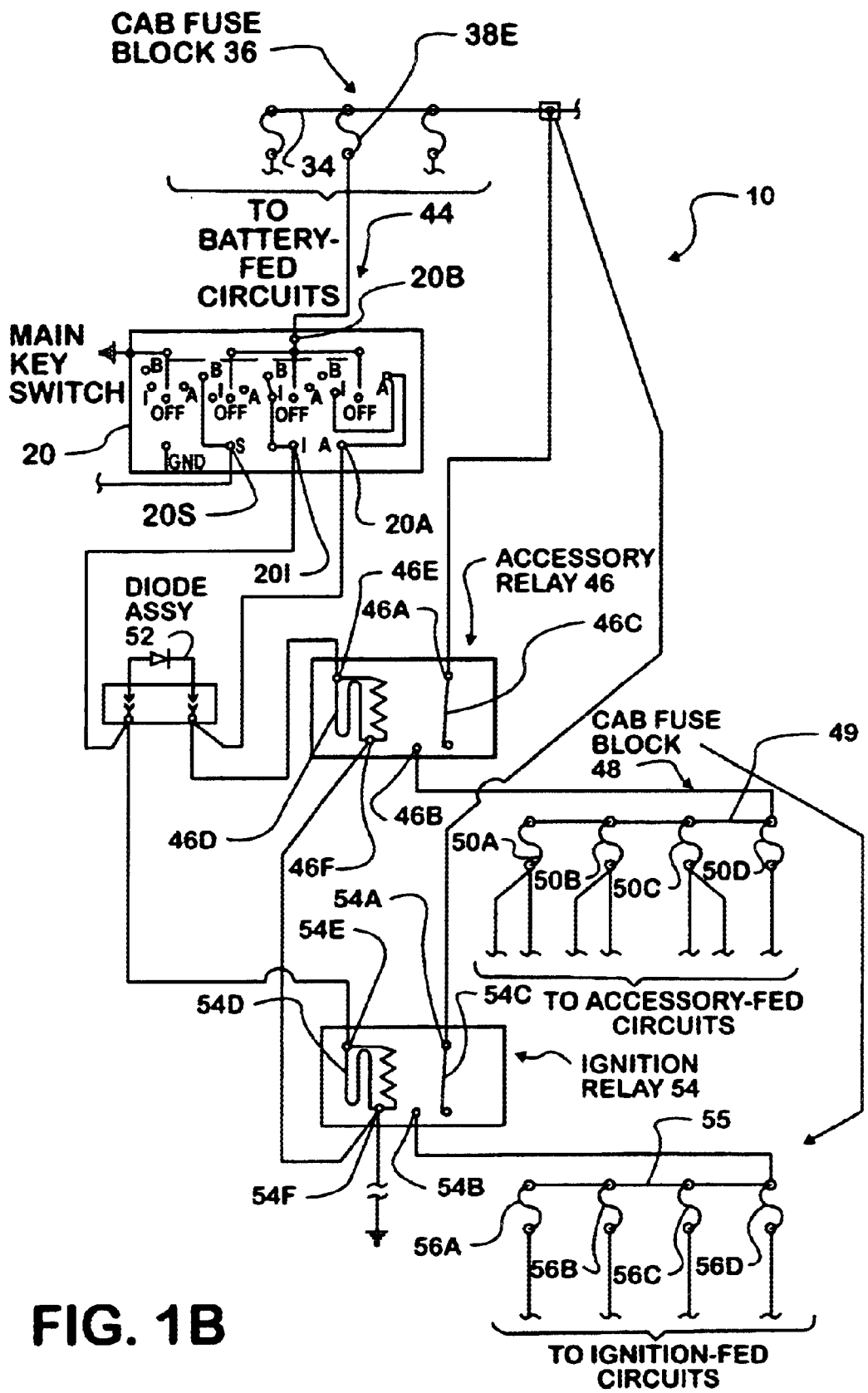
FIG. 1B is a schematic diagram of another portion of the motor vehicle electrical system in accordance with principles of the present invention.

FIGS. 1A and 1B collectively show a portion of a motor vehicle electrical system 10 that incorporates a battery disconnect switch circuit according to principles of the present invention. In this example, the vehicle is a truck that has a chassis and is powered by a diesel engine. The truck may be a tractor that has a fifth wheel for haul a trailer. The truck cab, or body, is mounted on the chassis rearward of an engine compartment that houses the engine and a battery bank. The engine has an electric cranking motor and an associated cranking motor solenoid that is energized to operate the cranking motor at engine starting.

Electrical system 10 comprises a battery bank 12 containing one or more individual D.C. storage batteries 16. In a heavy truck powered by a diesel engine, such as engine 14, battery bank 12 contains multiple batteries 16 ganged together. When engine 14 is running, batteries 16 are kept charged by an engine-driven alternator 18 having positive and negative terminals 18A, 18B.

Running of the engine is under the control of a main switch 20 that is typically key-operated and commonly referred to as an ignition switch, even in a vehicle whose engine relies on compression of fuel in the engine cylinders for ignition rather than on spark ignition. FIGS. 1A and 1B show a positive voltage electrical system where the negative battery terminals are grounded and the positive battery terminals are connected to one terminal 22A of a cranking motor solenoid 22 for operating an electric cranking motor 24 for cranking engine 14 at starting.

Solenoid 22 is typically integrated with cranking motor 24 so other than terminal 22A, the only external terminals of the combined devices to which conductors attach are a common ground terminal 24G and a terminal 22B for energizing solenoid 22. Solenoid 22 comprises a coil 22C connected between terminal 22B and ground terminal 24G and an armature that is operated by coil 22C and that carries a contact 22D. When coil 22C is not energized, as shown in FIG. 1A, contact 22D does not bridge terminal 22A to an internal terminal 22E that is connected internally of the combined devices to a terminal 24A of motor 24. When coil 22C is energized, contact 22D bridges terminal 22A to terminal 22E thereby connecting the positive battery bank terminal to motor terminal 24A. Cranking current now flows to operate motor 24, thereby cranking engine 14.

Switch 20 can be placed in any of multiple positions, four in this instance: ACCESSORY, OFF, IGNITION, and START. FIG. 1B shows switch 20 in OFF position. Placement of switch 20 in START position causes coil 22C to be energized via a cranking motor solenoid circuit that will be explained later.

To continue with description of FIG. 1A, a fusible link 26 forms a portion of the circuit between alternator terminal 18A and solenoid terminal 22A. Another fusible link 28 is in a circuit branch from terminal 22A to a battery terminal 30A of a disconnect switch 30 which also comprises a load terminal 30B. The latter connects through a megafuse 32 to a bus 34 of a fuse block 36. FIG. 1A shows disconnect switch 30 in its OFF position not bridging terminals 30A, 30B. When in its ON position, disconnect switch 30 bridges terminals 30A, 30B.

The truck may have one or more fuse blocks mounted at any suitable location or locations on either the interior or the exterior of the truck cab. A fuse block contains multiple circuit protection devices, such as fuses or circuit breakers, for distributing current to individual circuits in the vehicle. Hence, FIG. 1A shows a number of fuses 38A, 38B, 38C, 38D, 38E, 38F on bus 34, each serving to protect a respective circuit. When disconnect switch 30 is on, positive battery voltage is applied to bus 34, Hence, all the circuits protected by fuses 38A, 38B, 38C, 38D, 38E, 38F are battery-fed.

One of those battery-fed circuits 38B is a cranking motor solenoid circuit 40 for energizing cranking motor solenoid 22. From fuse 38B, circuit 40 leads to a terminal 42A of a relay 42 that comprises a normally open contact 42C between terminal 42A and another terminal 42B. Relay 42 further comprises a coil 42D between terminals 42E, 42F. Terminal 42F is connected to a terminal 20S of switch 20, and terminal 42E to ground through a normally closed thermal protection switch 24S in motor 24.

When disconnect switch 30 is in ON position and coil 42D is energized, contact 42C operates to connect terminal 42A to a terminal 42G that is in turn connected to terminal 22B, thereby energizing coil 22C of solenoid 22. With solenoid 22 now energized, contact 22D completes a circuit to run motor 24 and hence crank engine 14. Motor 24 is allowed to run as long as it does not overheat. If overheating occurs, switch 24S opens to interrupt the coil-energizing current through relay coil 42D, and open contact 42C to thereby open the circuit to coil 22C. If motor were not provided with thermal protection, terminal 42E would connect directly to ground.

A portion of fuse block 36 is repeated in FIG. 1B to show fuse 38E feeding a terminal 20B of switch 20. Switch 20 further comprises an accessory terminal 20A and an ignition terminal 20I. When in OFF position, switch 20 does not feed battery voltage to any of terminals 20A, 20I, 20S. When turned in one sense from OFF position to ACCESSORY POSITION, switch 20 feeds battery voltage only to terminal 20A. When turned in the opposite sense from OFF position to IGNITION position, switch 20 feeds battery voltage to both terminals 20A, 20I. When turned beyond IGNITION position to START position against the force of a return spring, switch 20 maintains the battery feed to terminal 20I while also feeding terminal 20S. Upon release from START position, the spring returns switch 20 to IGNITION position.

In addition to the group of circuits that are battery-fed, a second group of circuits are accessory-fed, and a third group are ignition-fed. In general, battery-fed circuits are those that are appropriate for operation when switch 20 is in OFF position. Examples are Ignition Switch, Clock, Cigar Lighter, and Power Outlets. Accessory-fed circuits are those for operating various accessory-type devices whose operation, while not essential for engine starting and running, is appropriate when the engine is not running, but nonetheless require use of a key to operate switch 20 from OFF position. Examples are Radios, and Sleeper Accessories. Any load that the accessory circuits may be imposing on the batteries is removed when the engine is being started because the feed to terminal 20A is broken when switch 20 is placed in START position. Ignition-fed circuits are those for operating various devices whose operation is called for when the engine is running or being started. The nature of switch 20 allows accessory-fed circuits to also operate when engine 14 is running. Examples of ignition-fed circuits are Heater—AC Control, Driver Display, and Engine.

While it would be possible to feed accessory-fed circuits directly from switch 20, load considerations render the use of one or more accessory relays a desirable, and typically preferred, alternative. The same is true in the case of ignition-fed circuits. FIG. 1B shows an accessory relay 46 and a further fuse block 48 comprising a bus 49 serving circuit protection devices 50A, 50B, 50C, and 50D.

Relay 46 comprises a normally open contact 46C between terminals 46A and 46B and a coil 46D between terminals 46E, 46F. Terminal 46E is connected to terminal 20A of switch 20, and terminal 46F to ground. Like bus 34, terminal 46A is connected to positive battery voltage while terminal 46B is connected to bus 49.

When switch 20 is in ACCESSORY and IGNITION positions, coil 46D is energized, causing contact 46C to complete a circuit from terminal 46A to terminal 46B and thereby feed battery voltage to bus 49, and hence to the accessory-fed circuits.

FIG. 1B further shows an ignition relay 54 and a further bus 55 in fuse block 48 serving circuit protection devices 56A, 56B, 56C, and 56D.

Relay 54 comprises a normally open contact 54C between terminals 54A and 54B and a coil 54D between terminals 54E, 54F. Terminal 54E is connected to terminal 201 of switch 20, and terminal 54F to ground. Like terminal 46A, terminal 54A is connected to positive battery voltage. Terminal 54B is connected to bus 55.

When switch 20 is in START and IGNITION positions, coil 54D is energized, causing contact 54C to complete a circuit from terminal 54A to terminal 54B and thereby feed battery voltage to bus 55, and hence to the ignition-fed circuits.

A diode assembly 52 is connected in circuit as shown to prevent a back-feed from terminal 20A that otherwise would energize coil 54D when switch 20 is in ACCESSORY position.

Rather than placing disconnect switch 30 in circuit between battery bank 12 and terminal 22A, the invention places disconnect switch 30 between battery bank 12 and a distribution point for the entire system load except the engine cranking motor. Terminal 30B could be considered that distribution point.

Such placement of disconnect switch 30 allows the circuit between battery bank 12 and cranking motor terminal 22A to be switch-free, providing important advantages, discussed earlier. Only a continuous heavy conductor 57 with suitable terminals at opposite ends is needed for an electrical system whose maximum current load can be handled by a single conductor of suitable current rating. Some electrical systems that have a higher current rating may use more than one continuous conductor. In an electrical system where the ground path from the cranking motor ground is not assured by attaching the cranking motor to the engine, one or more cables may be used to provide some or all of the ground path.

FIG. 2 shows a disconnect switch 30 mounted on an instrument panel 58 in the truck cab. Switch 30 comprises a body portion 60 disposed for the most part behind the panel. A threaded neck protrudes through a hole in the panel. Fasteners 61 threaded onto the neck are tightened against opposite faces of panel 58 to secure the switch mounting. An actuator portion of the switch comprises a lever 62 disposed frontally of the panel where it is available for manual operation by the driver. Lever 62 turns a shaft about an axis 64 to respective positions for operating switch 30 to open and closed positions.

FIG. 3 shows another disconnect switch 30 also mounted on instrument panel 58 in a similar manner. This switch differs from the one in FIG. 2 in that its actuator 66 comprises a key-operated lock that can be placed in a locking condition when the switch is in its OFF position to prevent the shaft from turning about axis 64 and thereby prevent disconnect switch operation to ON position. The switch can be operated to its ON position by inserting the shaft of a key 68 into the lock and then turning the key.

Figure 4:
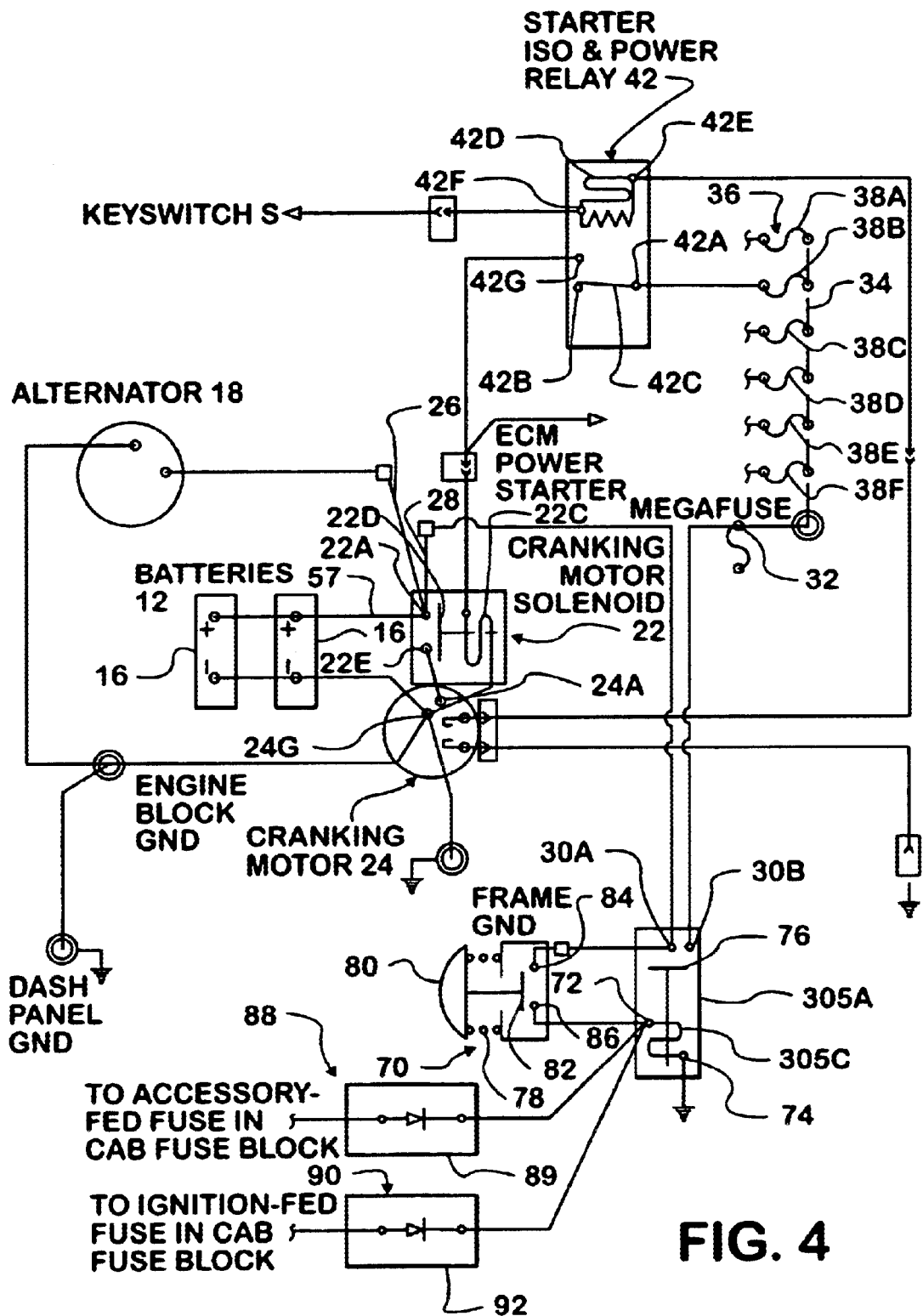
FIG. 4 is a schematic diagram corresponding to FIG. 1A, but showing a third embodiment of disconnect switch in accordance with principles of the present invention.

FIG. 4 illustrates a circuit like that of FIG. 1A but with a solenoid-actuated disconnect switch 30SA in circuit between the battery bank and a main distribution point. Terminal 30B can continue to be considered the main distribution point through which current is delivered from the battery bank to all electrical devices in the electrical system except cranking motor 24 and a normally open switch 70 that is associated with disconnect switch 30SA.

Switch 30SA comprises a solenoid coil 30SC connected between a terminal 72 and a terminal 74, the latter being grounded. An armature that is operated by coil 30SC carries a contact 76. When coil 30SC is not energized, as shown in FIG. 4, contact 76 does not bridge terminal 30A to terminal 30B. That is the OFF position. When coil 30SC is energized, contact 76 bridges terminal 30A to terminal 30B thereby placing the disconnect switch in ON position.

Switch 70 comprises a momentary-contact, spring-return switch that is biased open by a return spring 78. When an actuator 80 is pushed in far enough against the spring force, a contact 82 completes a circuit between terminals 84, 86, thereby closing the switch.

Terminal 84 is connected to terminal 30A, and terminal 86, to terminal 72. A first sealing circuit 88 comprising a diode 89 is connected between bus 49 and terminal 72. A second sealing circuit 90 comprising a diode 92 is connected between bus 55 and terminal 72.

The circuit operates in the following way. The driver turns switch 20 to either the IGNITION or the ACCESSORY position and forces switch 70 closed by pushing actuator 80. Those two actions collectively serve to complete a circuit through switch 70 from terminal 30A to terminal 72 that energizes coil 30SC and consequently closes disconnect switch 30SA to connect bus 34 to battery bank 12. Because switch 20 is in either the IGNITION or the ACCESSORY position, busses 49 and 55 are also energized so that regardless of which way the driver turns switch 20 from its OFF position, there will be a feed through one of the two diodes 89, 92 that will seal coil 30SC energized when the two actions have been completed. Sealing coil 30SC energized will keep the disconnect switch on after the driver releases actuator 80.

If switch 20 has been placed in IGNITION position, busses 34, 55 will remain energized when switch 20 is placed in START position so that coil 30SC will continue to be sealed as motor 22 cranks engine 14. When switch 20 is placed in OFF position, the sealing feeds are removed, and so disconnect switch 30SA will open.

Figure 5:
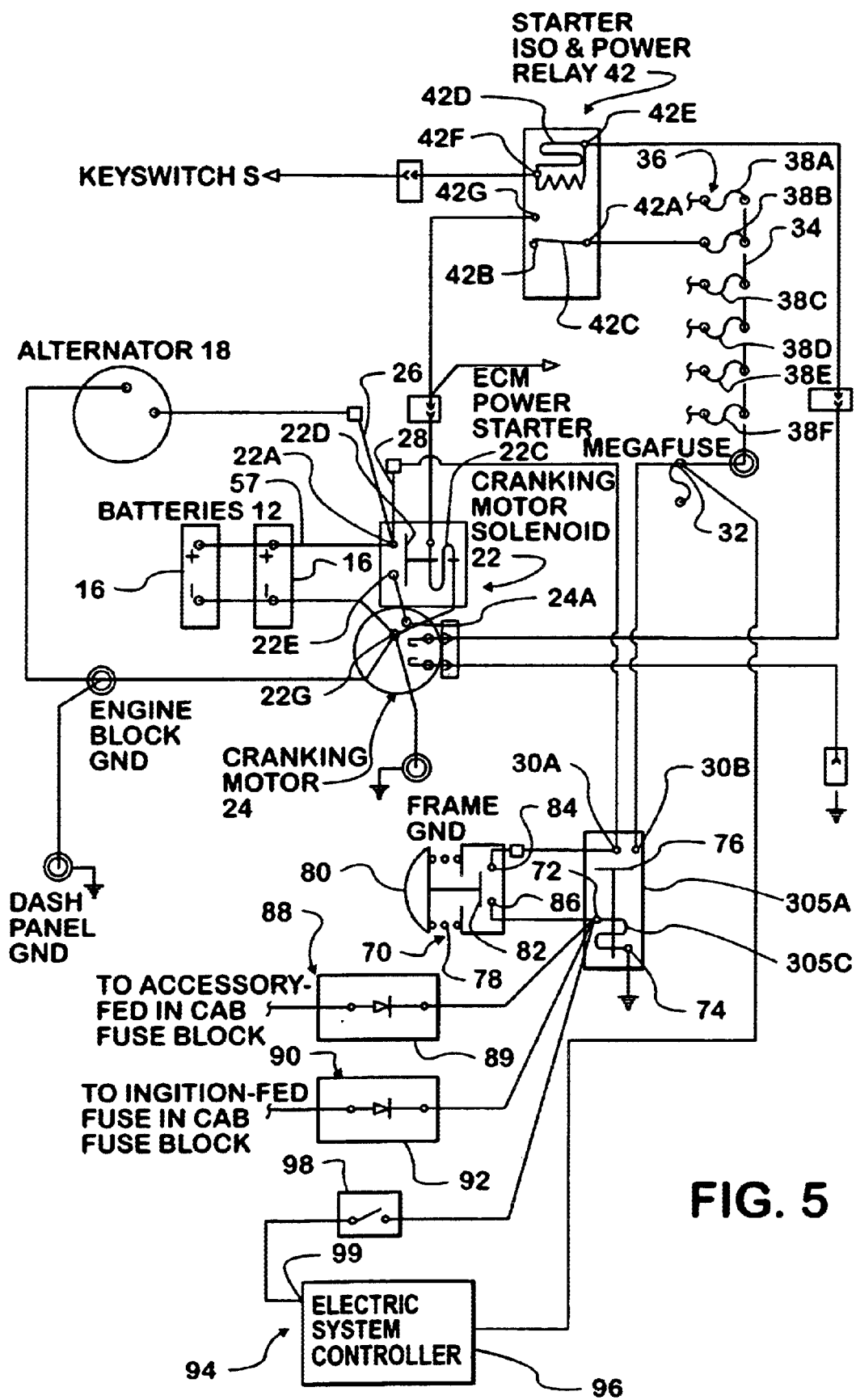
FIG. 5 is a schematic diagram similar to FIG. 4, but showing a fourth embodiment in accordance with principles of the present invention.

FIG. 5 illustrates a circuit like that of FIG. 4 but with an additional circuit for sealing coil 30SC energized. Sealing circuits 88, 90 are enhanced by a further sealing circuit 94 that includes an electric system controller 96 and a control switch 98. System controller 96 is energized once contact 76 bridges terminals 30A, 30B as a result of energizing coil 30 SC by closure of switch 70. The energization of system controller 96 causes voltage to appear at an output 99, and with control switch 98 closed, that voltage delivers current through switch 98 to seal coil 30 SC energized.

With switch 98 remaining closed, operation of switch 20 to its OFF position will not open disconnect switch 30SA. Switch 30SA will open however if switch 98 is open when switch 20 is operated to its OFF position, thereby breaking the seal to coil 30SC. On the other hand, disconnect switch 30SA will remain closed if switch 98 is in closed condition when switch 20 is operated to its OFF position. As long as switch 98 remains closed and switch 20 remains OFF, disconnect switch 30 SA will continue to be closed until such time as battery bank voltage drops below some predetermined value that separates a range of higher voltages from a lower range, at which time disconnect switch 30SA opens. That occurs because system controller 96 possesses a battery-monitoring capability that will remove voltage from output 99 should battery voltage fall into the lower range, chosen with the view toward enabling the engine to still be cranked even after some limited battery bank drainage.

The invention is believed to provide a useful and cost-beneficial improvement for avoiding unintended battery draining in a motor vehicle when parked for an extended period of time and in doing eliminating sources of resistance in the circuit to the cranking motor. It can also avoid the potentially undesirable application of low voltages to the electrical system if the battery bank were to drain.

While a presently preferred embodiment of the invention has been illustrated and described, it should be appreciated that principles of the invention are applicable to all embodiments that fall within the scope of the following claims.

What is claimed is:

1. An engine-powered land vehicle comprising:
    a chassis comprising an engine and a drivetrain through which the engine propels the vehicle on land;
    a body disposed on the chassis and comprising a driver's compartment for a driver of the vehicle;
    a battery bank comprising one or more D.C. storage batteries;
    an electric cranking motor that draws current from the battery bank to crank the engine at starting when a cranking motor solenoid is energized;
    a main control switch that can be placed selectively in any one of multiple positions by the driver to selectively control the delivery of current from the battery bank to multiple circuit protection devices for distributing current to individual circuits in the vehicle, including a cranking motor solenoid circuit through which the cranking motor solenoid is energized;
    a disconnect switch in circuit between the battery bank and the multiple circuit protection devices for selectively connecting and disconnecting the multiple circuit protection devices to and from the battery bank; and
    a switch-free electric circuit for providing continuity between the battery bank and a terminal of the cranking motor solenoid, both when the disconnect switch is connecting the multiple circuit protection devices to the battery bank and when the disconnect switch is disconnecting the multiple circuit protection devices from the battery bank, for carrying current from the battery bank to a terminal of the cranking motor solenoid that is connected through a closed contact in the solenoid to the cranking motor when the cranking motor solenoid circuit is energizing a coil in the cranking motor solenoid that is forcing the contact in the solenoid closed.

2. A vehicle as set forth in claim 1 in which the disconnect switch is disposed within the driver's compartment for manual operation by the driver.

3. A vehicle as set forth in claim 2 in which the disconnect switch comprises an actuator that turns about an axis to respective positions for connecting and disconnecting the multiple circuit protection devices to and from the battery bank.

4. A vehicle as set forth in claim 3 in which the actuator comprises a lock that can be placed in a locking condition to prevent disconnect switch operation out of the position disconnecting the multiple circuit protection devices from the battery bank.

5. A vehicle as set forth in claim 1 in which the disconnect switch comprises an electric actuator for operating the disconnect switch from the position disconnecting the multiple circuit protection devices from the battery bank to the position connecting the multiple circuit protection devices to the battery bank, and in which the vehicle comprises a further switch that is operable by the driver for operating the electric actuator.

6. A vehicle as set forth in claim 5 in which the further switch comprises a momentary-contact, spring-return switch.

7. A vehicle as set forth in claim 6 in which the further switch is disposed within the driver's compartment.

8. A vehicle as set forth in claim 7 in which the main control switch can be placed selectively in an OFF position for preventing the delivery of current from the battery bank to the multiple circuit protection devices, an ACCESSORY position for allowing delivery of current from the battery bank to circuits of a first group of the individual circuits to which group current is distributed through a first group of the circuit protection devices, and an IGNITION position for allowing delivery of current from the battery bank to circuits of the first group of the individual circuits and also to a second group of the individual circuits to which second group current is distributed through a second group of the circuit protection devices, in which operation of the momentary-contact, spring-return switch, while the main control switch is in ACCESSORY position and the disconnect switch is in the position disconnecting the multiple circuit protection devices from the battery bank, energizes the electric actuator to cause the disconnect switch to operate to the position connecting the multiple circuit protection devices to the battery bank, and one of the circuits in the first group of circuits comprises a scaling circuit to the electric actuator for sealing the electric actuator energized upon release of the momentary-contact, spring-return switch, in which operation of the momentary-contact, spring-return switch, when the main control switch is in IGNITION position and the disconnect switch is in position disconnecting the multiple circuit protection devices from the battery bank, energizes the electric actuator to cause the disconnect switch to operate to the position connecting the multiple circuit protection devices to the battery bank, and one of the circuits in the second group of circuits comprises a sealing circuit to the electric actuator for sealing the electric actuator energized upon release of the momentary-contact, spring-return switch, and including a diode network for preventing a back-feed from each sealing circuit to the other sealing circuit.

9. A vehicle as set forth in claim 8 in which the main control switch, after having been placed in the IGNITION position, can be placed in a START position for energizing the cranking motor solenoid without interruption of delivery of current from the battery bank to the second group of the individual circuits to which current is distributed through the second group of the circuit protection devices, but with interruption of delivery of current from the battery bank to the first group of the individual circuits to which current is distributed through the first group of the circuit protection devices.

10. A vehicle as set forth in claim 6 further including an electrical component that monitors battery bank voltage to distinguish a range of higher battery bank voltages from a range of lower voltages by producing a voltage output at an output terminal when battery bank voltage is in the higher range and not producing the voltage output when battery bank voltage is in the lower range, and a sealing switch connected in circuit between the output terminal and the electric actuator, and in which operation of the momentary-contact, spring-return switch while the disconnect switch is in the position disconnecting the multiple circuit protection devices from the battery bank, energizes the electric actuator to cause the disconnect switch to operate to the position connecting the multiple circuit protection devices to the battery bank, and upon release of the momentary-contact, spring-return switch, the coincidence of battery bank voltage in the higher range and the sealing switch being closed, seals the electric actuator energized until either battery bank voltage enters the lower range or the sealing switch opens.

11. A vehicle as set forth in claim 1 in which the vehicle comprises a tractor for hauling a trailer, the body comprises a truck cab mounted on the chassis rearward of an engine compartment that houses the engine, the battery bank, the cranking motor, and the cranking motor solenoid, and the disconnect switch is disposed within the truck cab.

12. A vehicle as set forth in claim 11 in which the disconnect switch is mounted on an instrument panel of the truck cab and comprises an actuator disposed for manual operation by the driver.

13. A vehicle as set forth in claim 12 in which the disconnect switch actuator turns about an axis to respective positions for connecting and disconnecting the multiple circuit protection devices to and from the battery bank.

14. A vehicle as set forth in claim 13 in which the disconnect switch actuator comprises a lock that can be placed in a locking condition to prevent disconnect switch operation out of the position disconnecting the multiple circuit protection devices from the battery bank.

15. A vehicle as set forth in claim 1 in which the vehicle comprises a tractor for hauling a trailer, the body comprises a truck cab mounted on the chassis rearward of an engine compartment that houses the engine, the battery bank, the cranking motor, and the cranking motor solenoid, the disconnect switch comprises an electric actuator for operating the disconnect switch from the position disconnecting the multiple circuit protection devices from the battery bank to the position connecting the multiple circuit protection devices to the battery bank, and including a further switch that is disposed within the truck cab for actuation by the driver to operate the electric actuator.

16. A vehicle as set forth in claim 15 in which the further switch comprises a momentary-contact, spring-return switch.

17. A vehicle as set forth in claim 16 in which the main control switch can be placed selectively in an OFF position for preventing the delivery of current from the battery bank to the multiple circuit protection devices, an ACCESSORY position for allowing delivery of current from the battery bank to circuits of a first group of the individual circuits to which group current is distributed through a first group of the circuit protection devices, and an IGNITION position for allowing delivery of current from the battery bank to circuits of the first group of the individual circuits and also to a second group of the individual circuits to which second group current is distributed through a second group of the circuit protection devices, in which operation of the momentary-contact, spring-return switch, while the main control switch is in ACCESSORY position and the disconnect switch is in the position disconnecting the multiple circuit protection devices from the battery bank, energizes the electric actuator to cause the disconnect switch to operate to the position connecting the multiple circuit protection devices to the battery bank, and one of the circuits in the first group of circuits comprises a sealing circuit to the electric actuator for sealing the electric actuator energized upon release of the momentary-contact, spring-return switch, in which operation of the momentary-contact, spring-return switch, when the main control switch is in IGNITION position and the disconnect switch is in position disconnecting the multiple circuit protection devices from the battery bank, energizes the electric actuator to cause the disconnect switch to operate to the position connecting the multiple circuit protection devices to the battery bank, and one of the circuits in the second group of circuits comprises a sealing circuit to the electric actuator for sealing the electric actuator energized upon release of the momentary-contact, spring-return switch, and including a diode network for preventing a back-feed from each sealing circuit to the other sealing circuit.

18. A vehicle as set forth in claim 17 in which the main control switch, after having been placed in the IGNITION position, can be placed in a START position for energizing the cranking motor solenoid without interruption of delivery of current from the battery bank to the second group of the individual circuits to which current is distributed through the second group of the circuit protection devices, but with interruption of delivery of current from the battery bank to the first group of the individual circuits to which current is distributed through the first group of the circuit protection devices.

19. A vehicle as set forth in claim 16 further including an electrical component that monitors battery bank voltage to distinguish a range of higher battery bank voltages from a range of lower voltages by producing a voltage output at an output terminal when battery bank voltage is in the higher range and not producing the voltage output when battery bank voltage is in the lower range, and a sealing switch connected in circuit between the output terminal and the electric actuator, and in which operation of the momentary-contact, spring-return switch while the disconnect switch is in the position disconnecting the multiple circuit protection devices from the battery bank, energizes the electric actuator to cause the disconnect switch to operate to the position connecting the multiple circuit protection devices to the battery bank, and upon release of the momentary-contact, spring-return switch, the coincidence of battery bank voltage in the higher range and the sealing switch being closed, seals the electric actuator energized until either battery bank voltage enters the lower range or the sealing switch opens.

20. An electrical system in an engine-powered land vehicle comprising:

a battery bank comprising one or more D.C. storage batteries;

an electric cranking motor that draws current from the battery bank to crank the engine at starting when a cranking motor solenoid is energized;

a disconnect switch in circuit between the battery bank and a distribution point for the entire electrical system load except the engine cranking motor for selectively connecting and disconnecting the entire electrical system load except the engine cranking motor to and from the battery bank; and a switch-free electric circuit for providing continuity between the battery bank and the cranking motor solenoid independent of the disconnect switch and for carrying current for operating the cranking motor.

21. An electrical system as set forth in claim 20 in which the switch-free electric circuit comprises a length of continuous conductor cable having a terminal at one end fastened to the battery bank and a terminal at another end fastened to a terminal of the cranking motor solenoid.

22. An electrical system as set forth in claim 21 in which the disconnect switch comprises a manual actuator.

23. An electrical system as set forth in claim 22 in which the actuator comprises a lock that can be placed in a locking condition to lock the disconnect switch in position disconnecting the entire electrical system load except the engine cranking motor from the battery bank.

24. An electrical system as set forth in claim 21 in which the disconnect switch comprises an electric actuator for operating the disconnect switch from the position disconnecting the entire electrical system load except the engine cranking motor from the battery bank to the position connecting the entire electrical system load except the engine cranking motor to the battery bank, and a further switch for operating the electric actuator.

25. An electrical system in an engine-powered land vehicle comprising:
   a battery bank comprising one or more D.C. storage batteries;
   an electric cranking motor that draws current from the battery bank to crank the engine at starting when a cranking motor solenoid is energized;
   a disconnect switch in circuit between the battery bank and a main distribution point through which current is delivered from the battery bank to all electrical devices in the electrical system except the cranking motor and a normally open switch that, when operated closed, energizes a solenoid coil that operates the disconnect switch from an OFF position disconnecting all the devices except the cranking motor and the normally open switch from the battery bank to an ON position connecting all the devices except the cranking motor and the normally open switch to the battery bank; and
   a switch-free electric circuit that provides continuity between the battery bank and the cranking motor solenoid and that carries current for operating the cranking motor and current for energizing the solenoid coil that operates the disconnect switch from OFF position to ON position when the normally open switch is operated closed.

26. An electrical system as set forth in claim 25 in which the normally open switch comprises a bias spring biasing the switch to normally open.

27. An electrical system as set forth in claim 25 in which a circuit that carries current that has passed through the main distribution point once the disconnect switch has assumed its ON position seals the solenoid coil that operates the disconnect switch from OFF position to ON position, energized.

28. An electrical system as set forth in claim 27 in which the circuit that seals the solenoid coil that operates the disconnect switch from OFF position to ON position is opened by operation of a main control switch shutting off the engine, thereby unsealing the sealed solenoid coil concurrent with shutting off the engine.

29. An electrical system as set forth in claim 27 in which the circuit that seals the solenoid coil that operates the disconnect switch from OFF position to ON position is opened to unseal the solenoid coil either by opening of a sealing switch or by battery bank voltage falling below a predetermined voltage.

30. An electrical system as set forth in claim 29 in which the circuit that seals the solenoid coil that operates the disconnect switch from OFF position to ON position is unaffected by operation of a main control switch shutting off the engine.

31. A method for avoiding draining a battery bank of one or more storage batteries in an engine-powered land vehicle to a point where the battery bank is incapable of operating an electric cranking motor to crank the engine at starting while providing a switch-free path for current flow from the battery bank to the cranking motor during engine cranking:
   placing a disconnect switch that can be operated to respective ON and OFF positions in circuit between the battery bank and multiple circuit protection devices that distribute current to individual circuits in the vehicle, including a cranking motor solenoid circuit through which a cranking motor solenoid is energized to connect the cranking motor to the battery bank for operating the cranking motor to crank the engine at starting, so that the circuit protection devices are connected to the battery bank when the disconnected switch is in ON position and disconnected from the battery bank when the disconnected switch is in OFF position; and
   connecting the cranking motor solenoid to the battery bank through a switch-free current path for delivering cranking current from the battery bank to the cranking motor via the solenoid when the disconnect switch is in ON position and the cranking motor solenoid is being energized by the cranking motor solenoid circuit.

* * * * *